(12) United States Patent
Peng et al.

(10) Patent No.: US 11,671,352 B2
(45) Date of Patent: Jun. 6, 2023

(54) MESSAGE SENDING METHOD, BINDING RELATIONSHIP ADVERTISING METHOD, APPARATUS, AND STORAGE MEDIUM

(71) Applicant: ZTE Corporation, Shenzhen (CN)

(72) Inventors: Shaofu Peng, Shenzhen (CN); Feicai Jin, Shenzhen (CN); BaoYa Zhang, Shenzhen (CN); Haihua Tang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 194 days.

(21) Appl. No.: 17/274,595

(22) PCT Filed: Sep. 12, 2019

(86) PCT No.: PCT/CN2019/105626
§ 371 (c)(1),
(2) Date: Mar. 9, 2021

(87) PCT Pub. No.: WO2020/052641
PCT Pub. Date: Mar. 19, 2020

(65) Prior Publication Data
US 2021/0273881 A1   Sep. 2, 2021

(30) Foreign Application Priority Data

Sep. 13, 2018   (CN) .......................... 201811070482.2

(51) Int. Cl.
*H04L 45/24* (2022.01)
*H04L 12/46* (2006.01)
(Continued)

(52) U.S. Cl.
CPC ........ *H04L 45/245* (2013.01); *H04L 12/4633* (2013.01); *H04L 45/50* (2013.01); *H04L 45/745* (2013.01)

(58) Field of Classification Search
CPC ... H04L 45/245; H04L 12/4633; H04L 45/50; H04L 45/745
See application file for complete search history.

(56) References Cited

U.S. PATENT DOCUMENTS

| | | |
|---|---|---|
| 2004/0165601 A1 | 8/2004 | Liu |
| 2015/0215198 A1* | 7/2015 | Wijnands ............... H04L 45/245 370/392 |

(Continued)

FOREIGN PATENT DOCUMENTS

| | | |
|---|---|---|
| CN | 101014014 A | 8/2007 |
| CN | 101090355 A | 12/2007 |

(Continued)

OTHER PUBLICATIONS

George Swallow et al: "Network Scaling with Aggregate LSPs," draft-swallow-mpls-aggregate-fec-01.txt, Network Scaling With Aggregate LSPS; Draft-Swallow-MPLS-Aggregate-FEC-01.txt, Internet Engineering Task Force, IETF, No. 1, Jul. 7, 2008, pp. 1-10. (Year: 2008).*

(Continued)

*Primary Examiner* — Donald L Mills
(74) *Attorney, Agent, or Firm* — Cantor Colburn LLP

(57) ABSTRACT

A message sending method, a binding relationship advertising method, a message sending apparatus, a binding relationship advertising apparatus, a storage medium and an electronic device are provided. The message sending method includes: receiving a first message on a first node subjected to route aggregation; in a case where the first message matches a first Incoming Label Map (ILM) table entry preset on the first node, swapping a label of the first message into an outgoing label corresponding to a detailed Forwarding Equivalence Class (FEC) to obtain a second message; and forwarding the second message to a down- (Continued)

Receiving, on a second node, a binding relationship advertised by a first node, wherein the first node is a node subjected to route aggregation, the binding relationship is a binding relationship between a container label and a first container FEC, the coNtainer label is a container label pre-assigned in the first node to the first container FEC, the first container FEC is an FEC which carries a container flag and is obtained after an aggregated route on the first node is configured, and the container flag is used for identifying that the first container FEC is of a container FEC type ⎯ S602 stream node according to a Label Switched Path (LSP) corresponding to the detailed FEC.

18 Claims, 5 Drawing Sheets

(51) Int. Cl.
*H04L 45/50* (2022.01)
*H04L 45/745* (2022.01)

(56) References Cited

U.S. PATENT DOCUMENTS

| | | | | |
|---|---|---|---|---|
| 2018/0351857 A1* | 12/2018 | Vairavakkalai | ......... | H04L 45/26 |
| 2018/0351862 A1* | 12/2018 | Jeganathan | ............ | H04L 45/02 |
| 2018/0351863 A1* | 12/2018 | Vairavakkalai | ......... | H04L 45/02 |
| 2018/0351882 A1* | 12/2018 | Jeganathan | ............ | H04L 45/02 |

FOREIGN PATENT DOCUMENTS

| | | |
|---|---|---|
| CN | 101656663 A | 2/2010 |
| CN | 102025632 A | 4/2011 |

OTHER PUBLICATIONS

International Search Report for corresponding application PCT/CN2019/105626 filed Sep. 12, 2019; dated Nov. 28, 2019.
European Search Report for corresponding application EP19861174; Report dated Nov. 3, 2021.
George Swallow, Network Scaling with Aggregated IP LSPs, Network Working Group, URL: draft-swallow-mpls-aggregated-fec-00, Jul. 2007.

\* cited by examiner

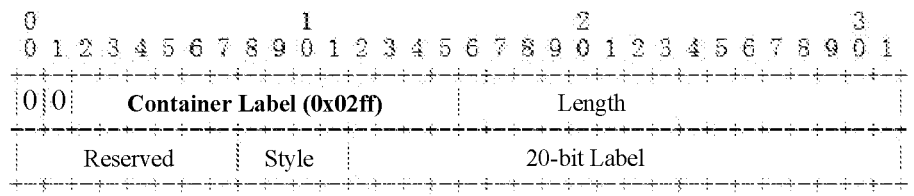

a)

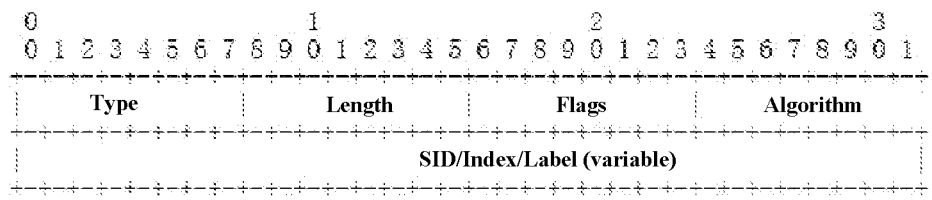

b)

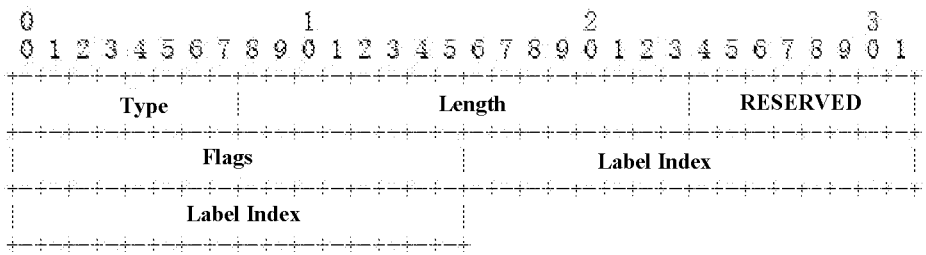

c)
Fig. 5

Receiving, on a second node, a binding relationship advertised by a first node, wherein the first node is a node subjected to route aggregation, the binding relationship is a binding relationship between a container label and a first container FEC, the coNtainer label is a container label pre-assigned in the first node to the first container FEC, the first container FEC is an FEC which carries a container flag and is obtained after an aggregated route on the first node is configured, and the container flag is used for identifying that the first container FEC is of a container FEC type ⎯ S602

MESSAGE SENDING METHOD, BINDING RELATIONSHIP ADVERTISING METHOD, APPARATUS, AND STORAGE MEDIUM

CROSS REFERENCE

This application is a National Stage Filing of the PCT International Application No. PCT/CN2019/105626 filed on Sep. 12, 2019, which claims priority to China Patent Application No. 201811070482.2 filed on Sep. 13, 2018, the entirety of which is herein incorporated by reference.

TECHNICAL FIELD

The present disclosure relates to the field of communication.

BACKGROUND

The concept of Forwarding Equivalence Class (FEC) aggregation and FEC aggregation strategies are proposed in a Multiprotocol Label Switching (MPLS, see Request for Comments (RFC) 3031) architecture.

However, there is inconsistency between the FEC aggregation strategy and a route aggregation strategy, and the end-to-end LSP cannot be established for the service after route aggregation.

SUMMARY

An aspect of the embodiments of the present disclosure provides a message sending method. The message sending method may include the following operations. A first message is received on a first node subjected to route aggregation. In a case where the first message matches a first Incoming Label Map (ILM) table entry preset on the first node, a label of the first message is swapped into an outgoing label corresponding to a detailed FEC to obtain a second message. The second message is forwarded to a downstream node according to an LSP corresponding to the detailed FEC.

Another aspect of the embodiments of the present disclosure provides a binding relationship advertising method. The binding relationship advertising method may include the following operations. A binding relationship advertised by a first node is received on a second node. Herein, the first node is a node subjected to route aggregation. The binding relationship is a binding relationship between a container label and a first container FEC. The container label is a label pre-assigned in the first node to the first container FEC. The first container FEC is an FEC which carries a container flag and is obtained after an aggregated route on the first node is configured. The container flag is used for identifying that the first container FEC is of a container FEC type.

Yet another aspect of the embodiments of the present disclosure provides a message sending apparatus. The message sending apparatus may include: a first receiving module, configured to receive a first message on a first node subjected to route aggregation; a swapping module, configured to swap, in a case where the first message matches a first ILM table entry preset on the first node, a label of the first message into an outgoing label corresponding to a detailed FEC to obtain a second message; and a forwarding module, configured to forward the second message to a downstream node according to an LSP corresponding to the detailed FEC.

Yet another aspect of the embodiments of the present disclosure provides a binding relationship advertising apparatus. The binding relationship advertising apparatus may include: a second receiving module, configured to receive, on a second node, a binding relationship advertised by a first node. Herein, the first node is a node subjected to route aggregation, the binding relationship is a binding relationship between a container label and a first container FEC, the container label is a label pre-assigned in the first node to the first container FEC, the first container FEC is an FEC which carries a container flag and is obtained after an aggregated route on the first node is configured, and the container flag is used for identifying that the first container FEC is of a container FEC type.

Yet another aspect of the embodiments of the present disclosure provides a storage medium. The storage medium may store a computer program that, when executed by a processor, causes the processor to perform the above message sending method or binding relationship advertising method.

Yet another aspect of the embodiments of the present disclosure provides an electronic device, which may include a memory and a processor. The memory may store a computer program executable by the processor, and the computer program, when executed by the processor, may cause the processor to perform the above message sending method or binding relationship advertising method.

BRIEF DESCRIPTION OF THE DRAWINGS

The accompanying drawings described herein are used to provide a deeper understanding of the present disclosure, and constitute a part of the present application. The exemplary embodiments of the present disclosure and the description thereof are used to explain the present disclosure. The drawings and the exemplary embodiment do not constitute limitations to the present disclosure. In the drawings:

FIG. 5 is a schematic diagram of an extended MPLS label protocol and an extended SR protocol according to an embodiment of the present disclosure;

FIG. 6 is a flowchart of a binding relationship advertising method according to an embodiment of the present disclosure;

DETAILED DESCRIPTION OF THE EMBODIMENTS

Figure 1:
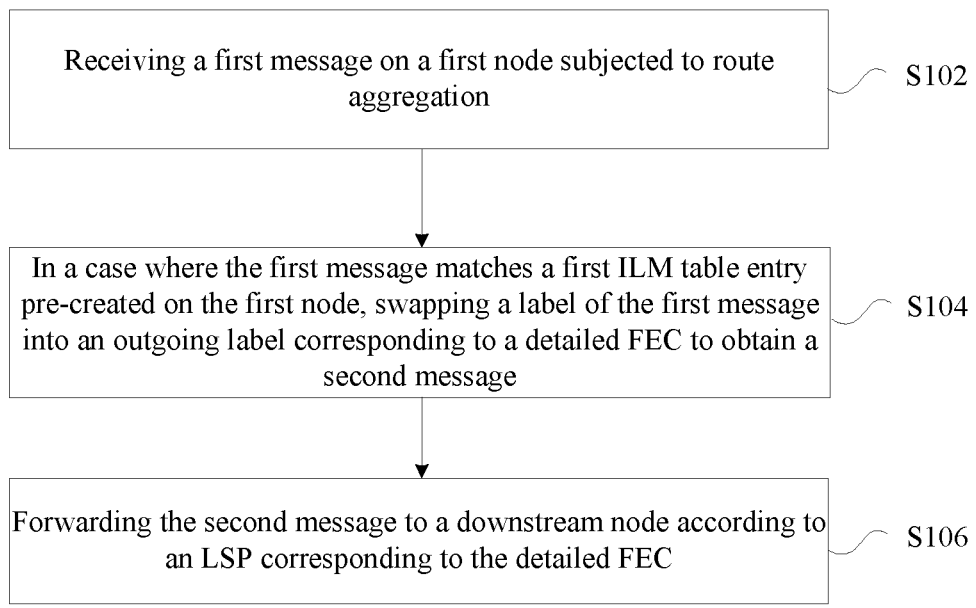
FIG. 1 is a flowchart of a message sending method according to an embodiment of the present disclosure.

The concept of Forwarding Equivalence Class (FEC) aggregation and FEC aggregation strategies are proposed in a Multiprotocol Label Switching (MPLS, see Request for Comments (RFC) 3031) architecture. The FEC aggregation strategy may be a coarse-grained aggregation strategy. For example, multiple different FECs are formed into a union. In this case, the union serves as one FEC, each member in the union is called a component FEC (also referred to as detailed FEC), and a single MPLS label is assigned to the union. The FEC aggregation strategy may also be a fine-grained aggregation strategy. For example, an MPLS label is assigned to each detailed FEC. The FEC aggregation strategy may also be an aggregation strategy between coarse-grained and fine-grained aggregation strategies. For example, the FEC aggregation strategy may simply follow a route aggregation strategy. In this case, an aggregated route is an FEC and is assigned with an MPLS label. Or, the FEC aggregation strategy may follow a per-Virtual Private Networks (VPN) label assignment mode in a Border Gateway Protocol (BGP) or an MPLS Internet Protocol (IP) VPN (see RFC4364). In this case, a Provider Edge (PE) device assigns the same MPLS label to all local Customer Edge (CE) device-side private network routes in the same VPN instance. From these examples, it can be seen that the FEC aggregation strategy is essentially a label assignment strategy. A corresponding label forwarding behavior is generally to continue forwarding based on an IP payload after the label is popped, and there are no new requirements for the existing MPLS forwarding mechanism. After the FEC aggregation occurs, an end-to-end MPLS Label Switched Path (LSP) is generally no longer established for the detailed FEC. However, in many scenarios, complex strategies still need to be configured to establish an end-to-end MPLS LSP for a specified detailed FEC.

In actual network deployment, after route aggregation, an Interior Gateway Protocol (IGP) (e.g., Intermediate System to Intermediate System (ISIS) and Open Shortest Path First (OSPF) protocols) inter-domain leakage is very common. The longest matching rule of IP forwarding naturally supports route aggregation, but the existing MPLS LSP forwarding mechanism is based on exact matching rules, so a certain number of end-to-end detailed FEC advertising are always required. In view of the inconsistency between the FEC aggregation strategy and the route aggregation strategy, the industry has proposed some solutions. For example, RFC5283 and RFC7032 extend a Label Distribution Protocol (LDP, see RFC5036). RFC5283 mainly modifies the original limitation, in RFC5036, of establishing an LSP only when the detailed FEC has an exact matching detailed route into establishing an LSP when the detailed FEC can match the longest route and a next hop of the route is a label advertising neighbor of the detailed FEC. RFC7032 mainly solves the problem of how the detailed FEC was generated and eliminated by enabling the service to dynamically trigger the establishment and destruction of the LSP of the detailed FEC, and provides a means of rapid convergence of LDP Downstream on Demand (DOD). This solution has limitations and cannot be used as a general solution for other MPLS LDPs, such as BGP and Segment Routing (SR, which, here, refers specifically to SR-MPLS, that is, when instantiating the SR over an MPLS forwarding plane).

The present disclosure is described below in detail with reference to the drawings and in conjunction with the embodiments. It is to be noted that embodiments in the present application and characteristics in the embodiments may be combined to derive other embodiments not explicitly described.

It is to be noted that the terms "first", "second" and the like in the specification, the claims and the drawings of the present disclosure are used to distinguish similar objects, and are not used to describe a specific sequence or a precedence order.

In an embodiment of the present disclosure, the concept of an FEC container is proposed to solve the problem of establishing an end-to-end LSP for services after route aggregation. The term "container FEC" distinguishes from the term "FEC aggregation", and there are differences in protocol advertising and forwarding mechanisms for "container FEC" and "FEC aggregation".

First, it is to be noted that, in the embodiments of the present disclosure, when describing the method from the perspective of a first node, a received message corresponds to a first message, a created ILM table entry corresponds to a first ILM table entry, a configured container FEC corresponds to a first container FEC, and a found FEC to Next Hop Label Forwarding Element (NHLFE) Map (FTN) table entry corresponds to a first FTN table entry.

FIG. 1 is a flowchart of a message sending method according to an embodiment of the present disclosure.

As shown in FIG. 1, in operation S102, a first message is received on a first node subjected to route aggregation.

In operation S104, in a case where the first message matches a first ILM table entry pre-created on the first node, a label of the first message is swapped into an outgoing label corresponding to a detailed FEC to obtain a second message.

In operation S106, the second message is forwarded to a downstream node according to an LSP corresponding to the detailed FEC.

The above operations may be performed by the above first node. In the above embodiment, an aggregated route may be marked as aggregation-prefix. On a first node subjected to route aggregation (the first node may be referred to as node A, and the first node subjected to the route aggregation may be marked as aggregation-prefix-A), a certain aggregation-prefix-A may be configured as a container FEC. The container FEC is an ordinary prefix FEC, except that it is marked with a container flag. Therefore, the container FEC should not be considered as a new FEC type. For example, for an LDP and a BGP, a label (such as an MPLS label, the following description uses the MPLS label as an example) may be normally assigned to the aggregation-prefix-A, a corresponding ILM table entry may be normally created for the aggregation-prefix-A, and a container flag may be marked in the ILM table entry. For an SR-MPLS protocol (such as ISIS, OSPF and BGP route protocols), prefix-sid (Segment ID) may be normally assigned to the aggregation-prefix-A, a corresponding ILM table entry may be normally created for the aggregation-prefix-A, and a container flag may also be marked in the ILM table entry.

Through the above method, by swapping a label of the message, an end-to-end LSP may be established simply based on the route aggregation, instead of configuring a complicated strategy to control the advertising operations of the detailed FEC to establish an end-to-end LSP, thereby effectively solving the problem that the end-to-end LSP cannot be established for the service after route aggregation.

According to the embodiment of the present disclosure, before the operation S102, the method may further include the following operations. An aggregated route is configured as a first container FEC on the first node, wherein the first container FEC carries a container flag used for identifying that the first container FEC is of a container FEC type. The first ILM table entry is created for the first container FEC, wherein the first ILM table entry carries the container flag. Through the above embodiment, an aggregated route on the first node may be configured as a container FEC and assigned with an MPLS label (the MPLS label may be called a container label), a corresponding ILM table entry may be created, and a container flag may be marked in the table entry. Therefore, for a message that matches this ILM table entry, an outgoing label corresponding to the detailed FEC can be looked up according to encapsulation information following a label in a message label stack, and a label swapping operation can be performed. The message will continue to be forwarded along an LSP corresponding to the detailed FEC.

According to the embodiment of the present disclosure, the operation S104 may include the following operations. In a case where the first message matches the first ILM table entry, the outgoing label corresponding to the detailed FEC is looked up according to encapsulation information following a container label in a message label stack, and the container label in the message label stack is swapped into the found outgoing label corresponding to the detailed FEC. Herein, the message label stack is a label stack generated on a node upstream of the first node, the container label is an MPLS label having a binding relationship with the first container FEC, and the encapsulation information is information about the detailed FEC encapsulated following the container label in the message label stack.

The method for generating a message label stack according to an embodiment of the present disclosure will be described in detail below.

A message received by node A (corresponding to the above first node) is generated on a node upstream of node A. In the embodiment, the upstream node may be node S in a route shown below.

S----P1----P2----A----P3----P4------D1
    \------D2
    \------D3

First, at node A subjected to route aggregation, detailed host routes (such as D1, D2 and D3) are aggregated into an aggregated route Dx, and the aggregated route Dx is flooded in the direction of node S. Specifically, the aggregated route Dx is configured as a container FEC to generate a container FEC Dx, a container label is assigned to the container FEC Dx, and the container FEC Dx is advertised in the direction of node S through node P2 and node P1 in sequence. After receiving the container FEC Dx, node P2 re-assigns a container label to the container FEC Dx, and advertises the container FEC Dx with the re-assigned container label to node P1. After receiving the container FEC Dx with the re-assigned container label, node P1 re-assigns the container label again to the container FEC Dx with the re-assigned container label, and advertises the container FEC Dx with the latest re-assigned container label to node S. Finally, an FTN table entry is generated on node S for the received container FEC Dx with the latest re-assigned container label. That is, there is an LSP corresponding to an FEC Dx on node S.

Second, on node S, for a message to be sent to a destination D1 (or D2, D3, etc.), node S will search for an FTN entry corresponding to the container FEC Dx with the latest re-assigned container label according to a destination IP D1. Since there is a container flag in the FTN table entry, node S encapsulates an outgoing label given in the FTN table entry for the message, and continues to encapsulate detailed FEC D1 information following the outgoing label, thereby generating a message label stack encapsulated with the container label and the detailed FEC D1.

According to the embodiment of the present disclosure, before looking up the outgoing label corresponding to the detailed FEC according to the encapsulation information following the container label in the message label stack, the method may further include an operation of configuring the binding relationship.

According to the embodiment of the present disclosure, after configuring the binding relationship, the method may further include an operation of advertising the binding relationship to nodes other than the first node.

According to the embodiment of the present disclosure, the operation that the outgoing label corresponding to the detailed FEC is looked up according to the encapsulation information following the container label in the message label stack includes the following operations. A first FTN table entry corresponding to the detailed FEC is looked up according to the encapsulation information following the container label in the message label stack. In a case where the first FTN table entry is found, an outgoing label in the first FTN table entry is determined as the outgoing label corresponding to the detailed FEC.

According to the embodiment of the present disclosure, after looking up the first FTN table entry corresponding to the detailed FEC according to the encapsulation information following the container label in the message label stack, the method may further include at least one of the following operations. In a case where the first FTN table entry is not found and a stack bottom flag of the container label in the message label stack is determined to be valid, the container label in the message label stack and the encapsulation information following the container label are removed, a routing table is looked up according to an IP payload, and the first message is forwarded according to the routing table. Alternatively or additionally, in a case where the first FTN table entry is not found and a stack bottom flag of the container label in the message label stack is determined to be invalid, the first message is discarded.

According to the embodiment of the present disclosure, before looking up the first FTN table entry corresponding to the detailed FEC according to the encapsulation information following the container label in the message label stack, the method may further include the following operation. The first FTN table entry corresponding to the first FEC generated by a previous node of the first node is maintained, wherein the previous node of the first node includes a node originally generating the first FEC.

According to the embodiment of the present disclosure, the first node may be used as an egress node of the container FEC. In this case, the label operation of the ILM table entry is POP. For example, for the message corresponding to the ILM table entry, an outgoing label of an FTN table entry (here, it is collectively referred to as found FTN, and the found FTN table entry is marked as FTN-detailed table entry) corresponding to the detailed FEC is found according to information of the detailed FEC following the container label in the message label stack, and a label swapping operation is performed between the container label in the message label stack and the outgoing label. In the embodiment of the present disclosure, the detailed FEC information may be expressed in multiple ways. For example, the detailed FEC may be an IP address, prefix-sid, and/or an MPLS label. Then, according to the local implementation, the actually found FTN table entry may be, for example, a routing table entry, an SID table entry, and/or a label table entry. It is to be noted that when RFC8029 is applied, a change of FEC actually occurs at the same time when the label swapping operation is performed on the message. The message continues to be forwarded along the LSP corresponding to the detailed FEC. It is to be noted that if there is no container flag in the found FTN-detailed table entry, the detailed FEC information immediately following the original container label in the message label stack should be removed when forwarding. If the FTN table entry corresponding to the detailed FEC cannot be found, the message is determined to be forwarded along the IP according to whether the bottom flag of the container label in the message label stack is valid. For example, if the stack bottom flag is valid, the container label in the message label stack and the following detailed FEC information are removed, and are forwarded according to an IP payload routing table. If the stack bottom flag is invalid, the message is discarded.

According to the embodiment of the present disclosure, when a type of the first FEC generated by the previous node of the first node is not a container FEC, the first FTN table entry does not include the container flag.

According to the embodiment of the present disclosure, when the type of the first FEC generated by the previous node of the first node is a container FEC, the first FTN table entry includes the container flag.

According to the embodiment of the present disclosure, the method may further include at least one of the following operations. When the first FTN table entry does not include the container flag, the container label in the message label stack is swapped into an outgoing label in the first FTN table entry, and the encapsulation information following the container label in the first message is removed. Alternatively or additionally, when the first FTN table entry includes the container flag, the container label in the message label stack is swapped into an outgoing label in the first FTN table entry, and the encapsulation information following the container label in the message label stack is reserved.

According to the embodiment of the present disclosure, an encapsulation form of the encapsulation information includes at least one of the following: an encapsulation form of directly encapsulating IP address information of the detailed FEC; and an encapsulation form of encapsulating at least one of the following information using an encapsulation header: IP address information, MPLS label information, and Segment Identification (SID) information of the detailed FEC, wherein the IP address information includes one of the following: complete IP address information, or host segment information including only an IP address.

According to the embodiment of the present disclosure, the encapsulation information immediately following the label in the message label stack may have multiple forms. For example, the encapsulation information may follow a Style-1 of directly encapsulating IP address information related to the detailed FEC. Alternatively, the encapsulation information may follow a Style-2 of encapsulating IP address information, MPLS label information, or SID information related to the detailed FEC into an encapsulation header (marked as container header). The IP address information may be complete IP address information, or host segment information that only encapsulates the IP address. In addition, the detailed FEC information may also follow other styles, for example, using a certain MPLS reserved label, followed by the detailed FEC information.

The encapsulation form of the above detailed FEC information is suggested to be specified as a configuration option when the container FEC is configured on node A. After the encapsulation form of the detailed FEC is configured, the configuration is usually not changed to avoid message parsing errors.

Figure 2:
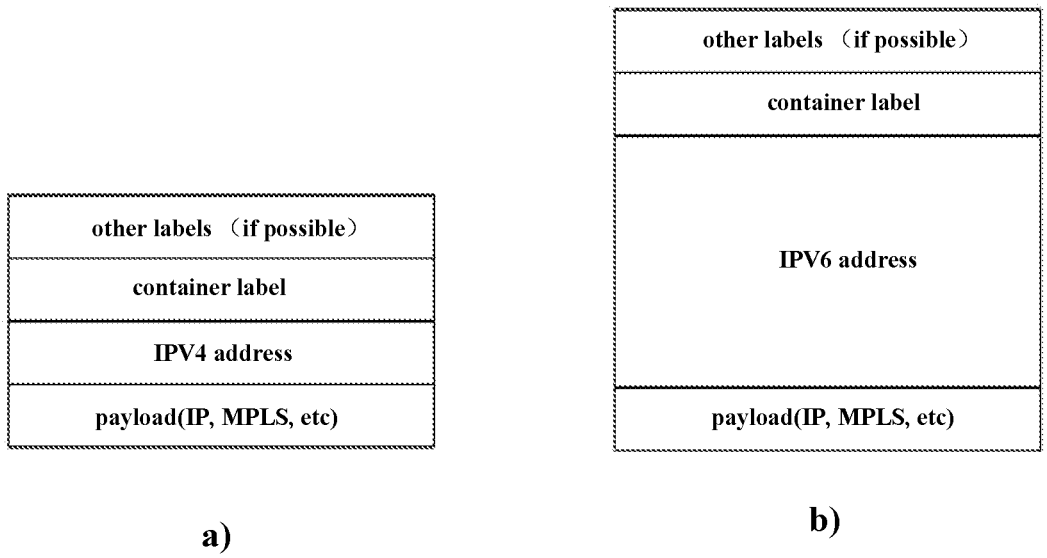
FIG. 2 is an encapsulation format of a detailed FEC according to an embodiment of the present disclosure.

FIG. 2 is an encapsulation format of a detailed FEC according to an embodiment of the present disclosure.

FIG. 2 shows a Style-1 encapsulation form of a detailed FEC. As shown in FIG. 2, in the Style-1 based message encapsulation, depending on whether the container FEC is an IPv4 prefix or an IPv6 prefix, the IP address information related to the encapsulated detailed FEC may be an IPv4 address (as shown in FIG. 2(a)) or an IPv6 address (as shown in FIG. 2(b)).

Figure 3:
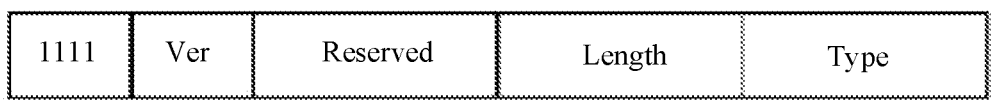
FIG. 3 is an encapsulation format of a detailed FEC according to another embodiment of the present disclosure.

FIG. 3 is an encapsulation format of a detailed FEC according to another embodiment of the present disclosure.

FIG. 3 shows a Style-2 encapsulation form of a detailed FEC. As shown in FIG. 3, a Style-2 based encapsulation header includes a first region, a Ver region, a Reserved region, a Length region, and a Type region. The first region occupies 4 bits, and the value is all 1. The Ver region occupies 4 bits, indicating a version number, and the current value is all 0. The Reserved region occupies 8 bits, indicating an unused reserved field, and the current value is all 0. The Length region occupies 8 bits, indicating how many bytes (for example, 4 bytes) the encapsulated detailed FEC information occupies. This length does not include the length of the encapsulation header. For example, the value range of the length of the detailed FEC information may be 1-4 bytes. The Type region occupies 8 bits, indicating an encapsulation type of the encapsulated detailed FEC information. Currently, four types are defined. Type=0 represents that the encapsulated information is a complete IP address corresponding to the detailed FEC, and Type=1 represents that the encapsulated information is host segment information of the IP address corresponding to the detailed FEC, and is mainly used for the encapsulation of IPv6 address information (or IPv4) to save the encapsulation size. After receiving the message, node A needs to combine this information (as a host segment of the complete IP address) with the aggregation-prefix-A (as a network segment of the complete IP address) to obtain a final complete IP address corresponding to the detailed FEC. Type=2 represents that the encapsulated information is MPLS label information corresponding to the detailed FEC, and is mainly used in a scenario where an MPLS label corresponding to the detailed FEC is used as the attribute of service advertising (such as VPN routing advertising). Type=3 represents that the encapsulated information is prefix-sid information corresponding to the detailed FEC, and is mainly used in a scenario where prefix-sid corresponding to the detailed FEC is used as the attribute of service advertising (such as VPN routing advertising).

Figure 4:
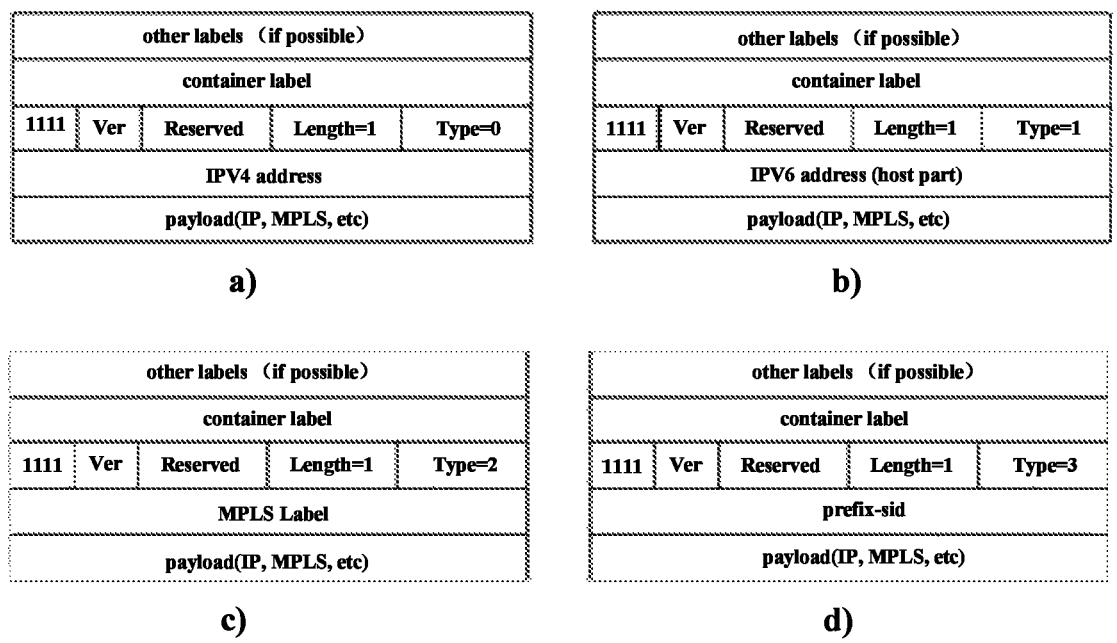
FIG. 4 is a message encapsulation format according to an embodiment of the present disclosure.

FIG. 4 is a message encapsulation format according to an embodiment of the present disclosure.

As shown in FIG. 4, the detailed FEC is encapsulated in the Style-2 encapsulation form. In the Style-2 based message encapsulation, depending on whether the container FEC is an IPv4 prefix or an IPv6 prefix, the IP address information related to the encapsulated detailed FEC may be an IPv4 address (as shown in (a) in FIG. 4) or an IPv6 Address (as shown in (b) in FIG. 4). When the IP address is an IPv6 address, the Type region in the encapsulation header may be set to Type=1. In this case, if the prefix-length of aggregation-prefix-A is 96 bits, only the 32-bit host segment of the IPv6 address corresponding to the detailed FEC needs to be encapsulated. In addition, the encapsulated detailed FEC information may also be an MPLS label (as shown in (c) in FIG. 4). In this case, the MPLS label is assigned by node A to the detailed FEC. In addition, the encapsulated detailed FEC information may also be prefix-sid (as shown in (d) in FIG. 4).

According to the embodiment of the present disclosure, the method may further include an operation of advertising the encapsulation form of the detailed FEC to nodes other than the first node.

According to the embodiment of the present disclosure, an advertising mode of advertising includes at least one of the following: extending an MPLS label protocol of a label binding message for advertising a prefix type FEC, and advertising by using the extended MPLS label protocol; and extending an SR protocol of a label binding message for advertising a prefix type FEC, and advertising by using the extended SR protocol. In the above embodiment, the first node may advertise the label binding message of the container FEC to a neighbor node through the MPLS label protocol, and accurately set the configured encapsulation style and type in an advertising message. The existing MPLS label protocol (such as LDP and BGP) and SR (such as ISIS, OSPF and BGP) that can support the advertising of the label binding message of the prefix type FEC may all be extended to support the advertising of label binding information of the container FEC. In order to be compatible with older devices, the advertising of label binding information of the container FEC cannot simply be supported by adding the container flag to the existing FEC advertising message. Otherwise, those nodes that cannot recognize the container flag may encapsulate the message by taking the container label as a normal MPLS label, so that the container label encapsulated in the message label stack of the message is not immediately followed by the detailed FEC information. Then, when such a message reaches node A, node A always considers that there is detailed FEC information immediately following the container label, which may inevitably lead to message parsing errors.

According to the embodiment of the present disclosure, when the MPLS label protocol includes an LDP, the operation of extending the LDP of the label binding message for advertising the prefix type FEC includes the following operations. Based on RFC5036, a Container Label Type-Length-Value (TLV) is added to the LDP. Advertising is performed by using the Container Label TLV in the extended LDP.

The embodiment of the present disclosure will be described below with reference to FIG. 5. According to the foregoing compatibility principle, a) in FIG. 5 is an exemplary implementation of extending an LDP to support the label binding information advertising of a container FEC. Based on RFC5036, a Container Label TLV is added, which is completely similar to the existing Generic Label TLV, except that the TYPE value is 0x02ff, and the value of a Style field may be 1 (see the foregoing Style-1) or 2 (see the foregoing Style-2). The interpretation of other fields is exactly the same as that of the Generic Label TLV. By this exemplary implementation of introducing a new Container Label TLV instead of extending and adding container flags in the existing Generic Label TLV or extending and adding container flags in the existing FEC TLV, those old devices that cannot recognize the Container Label TLV may directly discard a received advertising message of the label binding information of the container FEC, and those new devices that can recognize the Container Label TLV can process normally and install a table entry.

According to the embodiment of the present disclosure, when the SR protocol includes an ISIS protocol, the operation of extending the ISIS protocol of the label binding message for advertising the prefix type FEC includes the following operations. Based on draft-ietf-isis-segment-routing-extensions-16, a Container-Prefix-SID Sub-TLV is added to the ISIS protocol. Advertising is performed by using the Container-Prefix-SID Sub-TLV in the extended ISIS protocol.

Similarly, b) in FIG. 5 is an exemplary implementation of extending an ISIS to support the label binding information advertising of a container FEC. Based on draft-ietf-isis-segment-routing-extensions-16, a Container-Prefix-SID Sub-TLV is added, which is completely similar to the existing Prefix-SID Sub-TLV, except that the TYPE value is 15. An S-Flag flag bit is added in the Flags field (value 0 corresponds to the foregoing Style-1 or value 1 corresponds to the foregoing Style-2). It is to be noted that the values of the following flag bits in Flags are fixed: N-Flag is fixed to 0, P-Flag is fixed to 1, and E-Flag is fixed to 0. The interpretation of other fields is exactly the same as that of Prefix-SID Sub-TLV. By this exemplary implementation of introducing a new Container-Prefix-SID Sub-TLV instead of extending and adding container flags in the existing Prefix-SID Sub-TLV or extending and adding container flags in the existing prefix advertising (for example, TLV-135 (Extended IPv4 reachability) is defined in RFC5305, TLV-235 (Multi-topology IPv4 Reachability) is defined in RFC5120, or TLV-236 (IPv6 IP Reachability) is defined in RFC5308, or TLV-237 (Multitopology IPv6 IP Reachability) is defined in RFC5120), those old devices that cannot recognize the Container-Prefix-SID Sub-TLV may directly discard a received advertising message of the label binding information of the container FEC, and those new devices that can recognize the Container-Prefix-SID Sub-TLV can process normally and install a table entry.

According to the embodiment of the present disclosure, when the SR protocol includes a BGP, the operation of extending the BGP of the label binding message for advertising the prefix type FEC includes the following operations. Based on draft-ietf-idr-bgp-perfix-sid-20, a Container-Label-Index TLV is added to the BGP, the Container-Label-Index TLV being carried along with BGP Prefix-SID attributes. Advertising is performed by using the Container-Label-Index TLV in the extended BGP.

Similarly, c) in FIG. 5 is an exemplary implementation of extending SR-BGP to support the label binding information advertising of a container FEC. Based on draft-ietf-idr-bgp-prefix-sid-20, a Container-Label-Index TLV is added, which is carried along with BGP Prefix-SID attributes and completely similar to the existing Label-Index TLV, except that the TYPE value is 2. An S-Flag flag bit is added in the Flags field (value 0 corresponds to the foregoing Style-1 or value 1 corresponds to the foregoing Style-2). The interpretation of other fields is exactly the same as that of Label-Index TLV. By this exemplary implementation of introducing a new Container-Label-Index TLV instead of extending and adding container flags in the existing Label-Index TLV or extending and adding container flags in the existing prefix advertising (for example, Labeled IPv4/IPv6 unicast prefixes is defined in RFC8277, referred to as a BGP-LU route), those old devices that cannot recognize the Container-Label-Index TLV may directly discard a received advertising message of the label binding information of the container FEC, and those new devices that can recognize the Container-Label-Index TLV can process normally and install a table entry.

The extensions of other MPLS label protocols (such as BGP) and SR (such as OSPF) are also compatible with this principle, and will not be repeated.

According to the embodiment of the present disclosure, a label operation in the first ILM table entry is POP.

The foregoing embodiment is described from the perspective of a message sending side. Further description is given below from the perspective of a message receiving side.

From the perspective of the message receiving side, the method includes the following operations. After receiving a second message on a second node, an MPLS label may be re-assigned to the first container FEC and a corresponding ILM table entry may be created, a container flag is marked in the table entry, and a label operation is SWAP. The second node may also create a corresponding FTN table entry for the container FEC, and mark a container flag in the table entry. Therefore, in a case where the message matches the FTN table entry, in addition to encapsulating a container label given by the FTN in the message label stack, the information about the detailed FEC is also encapsulated immediately following the container label in the message label stack. It is to be noted that, from the perspective of the second node side, a received message corresponds to a second message, a created ILM table entry corresponds to a second ILM table entry, and a created FTN table entry corresponds to a second FTN table entry.

A binding relationship advertising method is provided in an embodiment of the present disclosure. FIG. 6 is a flowchart of a binding relationship advertising method according to an embodiment of the present disclosure. As shown in FIG. 6, the flow includes operation S602.

In operation S602, a binding relationship advertised by a first node is received on a second node. Herein, the first node is a node subjected to route aggregation. The binding relationship is a binding relationship between a container label and a first container FEC. The container label is a label pre-assigned in the first node to the first container FEC. The first container FEC is an FEC which carries a container flag and is obtained after an aggregated route on the first node is configured. The container flag is used for identifying that the first container FEC is of a container FEC type.

It is to be noted that in the foregoing embodiment, the binding relationship is advertised to other nodes except the first node. The second node in the embodiment of the present disclosure may be one of the other nodes in the foregoing embodiment. Subsequent embodiments are further descriptions of actions after the second node receives the above binding relationship.

According to the embodiment of the present disclosure, after receiving, on the second node, the binding relationship advertised by the first node, the method may further include at least one of the following operations. When the second node is a transmission node of the first container FEC, a new container label is assigned to the first container FEC, then a binding relationship between the new container label and the first container FEC is advertised to an upstream node, and a second ILM table entry corresponding to the first container FEC is created, wherein the second ILM table entry carries the container flag. Alternatively or additionally, when the second node is an ingress node of the first container FEC, a corresponding second FTN table entry is created for the first container FEC, wherein the second FTN table entry carries the container flag.

According to the embodiment of the present disclosure, after creating the second ILM table entry corresponding to the first container FEC, the method may further include the following operations. In a case where the received message matches the second ILM table entry, a label swapping operation is executed according to a container label located at a top layer of the message, and information about a detailed FEC following the container label of the message is ignored. Or, in a case where the received message matches the second ILM table entry and a Time-to-Live value (TTL) of the container label located at a top layer of the message times out, the message is uploaded to a control plane for processing, wherein information about a detailed FEC following the container label in the message is not a label.

According to the embodiment of the present disclosure, after creating the second ILM table entry corresponding to the first container FEC, the method may further include the following operations. In a case where the received message matches the second FTN table entry, a container label in the second FTN table entry is encapsulated for the message, and information about a detailed FEC is encapsulated following the container label, wherein the container label and the information about the detailed FEC are integrated.

In the above embodiment, after the second node receives the label binding message of the container FEC, the second node may be used as a transmission node of the container FEC, an MPLS label may be assigned to the container FEC and a corresponding ILM table entry may be created, a container flag is marked in the table entry, and a label operation is SWAP. For the MPLS message that matches this ILM entry generally, only label swapping is performed based on the container label located at the top layer of the message, and the information about the detailed FEC immediately following the container label in the message is not perceived and parsed. In some special scenarios (such as tracerout), the second node may receive an MPLS message and find that the TTL of the container label at the top layer has timed out. When performing FEC check and label check according to RFC8029, the information about the detailed FEC immediately following the container label should be ignored and cannot be mistaken as a label to affect the check result. The second node may also be used as an ingress node of the container FEC to create a corresponding FTN entry (marked as FTN-aggregation) for the container FEC. If a container flag is marked in the table entry, for the message that matches the FTN table entry, not only the container label is encapsulated, but also the information about the detailed FEC is encapsulated immediately following the container label. It is to be noted that the detailed FEC information encapsulated immediately following the container label cannot be regarded as a label, but is integrated with the container label. The detailed FEC information encapsulated immediately following the container label does not affect the EXP, TTL, and S settings of the container label in the message. In the embodiment of the present disclosure, the second node may even further aggregate the routes. For example, the further aggregated route is aggregation-prefix-B. Similar to the first node, the aggregation-prefix-B is configured as the container FEC and a corresponding ILM table entry is established, the table entry is marked with a container flag, and the label operation is POP. Then, for the message that matches this ILM table entry, the FTN table entry may be looked up according to the detailed FEC information immediately following the container label in the message label stack. When the FTN table entry (that is, the above FTN-aggregation table entry) is found, the label of the message and an outgoing label of the FTN-aggregation table entry are subjected to a label swapping operation, and the message continues to be forwarded along an LSP corresponding to the FTN-aggregation (it is to be noted that since there is a container flag in the found FTN-aggregation table entry, the detailed FEC information immediately following the original container label in the message label stack is reserved during forwarding). If the FTN table entry is not found, the message may continue to be forwarded along the IP or discarded according to whether a stack bottom flag of the container label is valid (when the stack bottom flag is valid, the container label in the message label stack and the detailed FEC information following are removed, and the message is forwarded based on the lookup in a routing table according to the IP payload).

According to the embodiment of the present disclosure, the method may further include the following operation. An encapsulation form advertised by the first node is received on the second node, wherein the encapsulation form is an encapsulation form of information about a detailed FEC encapsulated following a container label in a message label stack in the first node. Similarly, in the foregoing embodiment, the encapsulation form is advertised to other nodes except the first node. The second node in the embodiment of the present disclosure may be one of the other nodes in the foregoing embodiment.

According to the embodiment of the present disclosure, the encapsulation form includes at least one of the following: an encapsulation form of directly encapsulating IP address information of the detailed FEC; and an encapsulation form of encapsulating at least one of the following information using an encapsulation header: IP address information, MPLS label information and SID information of the detailed FEC. Herein, the IP address information includes one of the following: complete IP address information, and host segment information including only an IP address.

The present disclosure will be described below in conjunction with exemplary embodiments.

Figure 7:
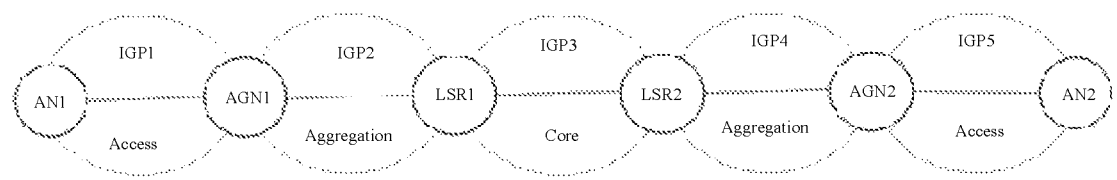
FIG. 7 is a network topology according to an embodiment of the present disclosure.

The network shown in FIG. 7 includes access, aggregation, and core domains. Each domain is deployed with a separate IGP (such as ISIS) process. After route aggregation, the aggregated route is redistributed between the IGP processes. In FIG. 7, AN represents an access node, AGN represents an aggregation node, and a Label Switching Router (LSR) represents a core node. For example, a loopback address of AN2 is 200.2.2.2, AGN2 may learn a detailed route 200.2.2.2/32 through an IGP5 process, and also redistribute an aggregated route 200.2.2.0/24 to an IGP4 process. LSR2 learns the route 200.2.2.0/24 through the IGP4 process, and also redistributes an aggregated route 200.2.0.0/16 to an IGP3 process. LSR1 learns the route 200.2.0.0/16 through the IGP3 process, and also redistributes an aggregated route 200.0.0.0/8 to an IGP2 process. AGN1 learns the route 200.0.0.0/8 through the IGP2 process, and also redistributes an aggregated route 0.0.0.0/0 (default route) to an IGP1 process. The LDP is enabled on the entire network. The message sending method according to an embodiment of the present disclosure includes operations 701 to 706.

In operation 701, on a node that redistributes an aggregated route, the redistributed aggregated route may be configured as a container FEC, an encapsulation style of the detailed FEC may be configured as Style-1, and the container FEC is synchronized to an LDP. The LDP may assign an MPLS label to the corresponding container FEC and advertise a binding relationship (using Container Label TLV) between the corresponding container FEC and the assigned MPLS label to a neighbor to generate an ILM table entry.

For example, a container FEC (IPv4 prefix 200.2.2.0/24) and a corresponding ILM table entry (marked as ILM-5) may be generated on AGN2. The label operation in the ILM table entry is POP and the ILM table entry contains a container flag, a Style-1 flag, and an IPv4 flag. AGN2 also maintains a corresponding FTN table entry (marked as FTN-5) for a detailed FEC (IPv4 prefix 200.2.2.2/32). The FTN table entry does not contain a container flag.

A container FEC (IPv4 prefix 200.2.0.0/16) and a corresponding ILM table entry (marked as ILM-4) may be generated on LSR2. The label operation in the ILM table entry is POP and the ILM table entry contains a container flag, a Style-1 flag, and an IPv4 flag. LSR2 also maintains a corresponding FTN table entry (marked as FTN-4) for a detailed FEC (IPv4 prefix 200.2.2.0/24). The FTN table entry contains a container flag and a Style-1 flag.

A container FEC (IPv4 prefix 200.0.0.0/8) and a corresponding ILM table entry (marked as ILM-3) may be generated on LSR1. The label operation in the ILM table entry is POP and the ILM table entry contains a container flag, a Style-1 flag, and an IPv4 flag. LSR1 also maintains a corresponding FTN table entry (marked as FTN-3) for a detailed FEC (IPv4 prefix 200.2.0.0/16). The FTN table entry contains a container flag and a Style-1 flag.

A container FEC (IPv4 prefix 0.0.0.0/0) and a corresponding ILM table entry (marked as ILM-2) may be generated on AGN1. The label operation in the ILM table entry is POP and the ILM table entry contains a container flag, a Style-1 flag, and an IPv4 flag. AGN1 also maintains a corresponding FTN table entry (marked as FTN-2) for a detailed FEC (IPv4 prefix 200.0.0.0/8). The FTN table entry contains a container flag and a Style-1 flag.

AN1 may maintain a corresponding FTN table entry (marked as FTN-1) for a detailed FEC (IPv4 prefix 0.0.0.0/0). The FTN table entry contains a container flag and a Style-1 flag.

In operation 702, it is assumed that AN1 needs to send an IPv4 message with a destination IP of AN2 (200.2.2.2) (this may be a PING message, BGP protocol message, etc.), the message matches the above FTN-1 table entry. Since the FTN-1 table entry contains a container flag and a Style-1 flag, the label given in the FTN-1 table entry is encapsulated in the IPv4 message (and a stack bottom flag of the label is set to 1). Meanwhile, the detailed FEC information (200.2.2.2) is encapsulated immediately following the label, and the message is forwarded to AGN1.

In operation 703, after AGN1 receives the message, the label of the received message matches the above ILM-2 table entry. The label operation in the ILM-2 table entry is POP and the ILM-2 table entry contains a container flag, a Style-1 flag, and an IPv4 flag. Then, the label at the top layer of the message and the detailed FEC information (200.2.2.2) immediately following the label are stripped off, and then a corresponding FTN table entry continues to be looked up based on the detailed FEC information (200.2.2.2) to determine that the message matches the above FTN-2 table entry. Since the FTN-2 table entry contains the container flag and the Style-1 flag, the label given in the FTN-2 table entry is encapsulated in the IPv4 message (and a stack bottom flag of the label is set to 1). Meanwhile, the detailed FEC information (200.2.2.2) is encapsulated immediately following the label, and the message is forwarded to LSR1.

In operation 704, similarly, after LSR1 receives the message, the label of the received message matches the above ILM-3 table entry. Similarly, the label at the top layer of the message and the detailed FEC information (200.2.2.2) immediately following the label are stripped off, and then the above FTN-3 table entry continues to be looked up and matched based on the detailed FEC information (200.2.2.2). Finally, the label given in the FTN-3 table entry is encapsulated in the IPv4 message (and a stack bottom flag of the label is set to 1). Meanwhile, the detailed FEC information (200.2.2.2) is encapsulated immediately following the label, and the message is forwarded to LSR2.

In operation 705, similarly, after LSR2 receives the message, the label of the received message matches the above ILM-4 table entry. Similarly, the label at the top layer of the message and the detailed FEC information (200.2.2.2) immediately following the label are stripped off, and then the above FTN-4 table entry continues to be looked up and matched based on the detailed FEC information (200.2.2.2). Finally, the label given in the FTN-4 table entry is encapsulated in the IPv4 message (and a stack bottom flag of the label is set to 1). Meanwhile, the detailed FEC information (200.2.2.2) is encapsulated immediately following the label, and the message is forwarded to AGN2.

In operation 706, similarly, after AGN2 receives the message, the label of the received message matches the above ILM-5 table entry. Similarly, the label at the top layer of the message and the detailed FEC information (200.2.2.2) immediately following the label are stripped off, and then the above FTN-5 table entry continues to be looked up and matched based on the detailed FEC information (200.2.2.2) to determine that the message matches the above FTN-5 table entry. Since the FTN-5 table entry does not contain the container flag, the label given in the FTN-5 table entry is encapsulated in the IPv4 message (and a stack bottom flag of the label is set to 1). Meanwhile, the detailed FEC information (200.2.2.2) is no longer encapsulated immediately following the label, and the message is forwarded to AN2.

So far, a path that uses label swapping along the entire route from AN1 to AN2 has been formed. The IPv4 payload has not been exposed throughout the entire process, and the detailed FEC for AN2 does not need to be advertised in the entire LDP. If the label swapping path needs to carry other MPLS payloads, such as VPN labels, the process is similar to the described flow. On the AN1 node, the VPN label (a stack bottom flag is 1) may be encapsulated for the message and the above FTN-1 table entry will finally be found according to BGP next-hop (AN2) through continuous iteration, and the container label (a stack bottom flag is 0) and the following detailed FEC information (200.2.2.2) are continuously encapsulated for the message. No detailed description is made.

In addition to LDP, SR-ISIS may also be used to send messages from AN1 to AN2. The exemplary process includes the following operations 1 and 2.

In operation 1, on a node that redistributes an aggregated route, the redistributed aggregated route may be configured as a container FEC and an encapsulation style of the detailed FEC may be configured as Style-1, so that an IGP may assign prefix-sid to the corresponding aggregated route and advertise (using Container-Prefix-SID Sub-TLV) the prefix-sid to a neighbor to generate an ILM table entry. The FTN and ILM table entries generated on each node are basically the same as the message sending process using LDP as described above.

In operation 2, it is assumed that AN1 needs to send an IPv4 message with a destination IP of AN2 (200.2.2.2), the message matches the above FTN-1 table entry. The subsequent forwarding process of the message is basically the same as the message sending process using LDP as described above.

So far, a path that uses label swapping along the entire route from AN1 to AN2 has been formed. The IPv4 payload has not been exposed throughout the entire process, and a detailed route for AN2 does not need to be flooded throughout the entire process.

Figure 8:
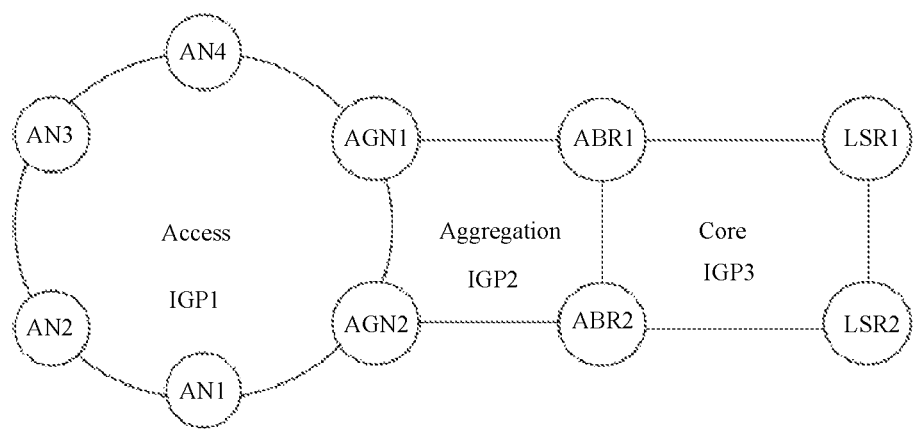
FIG. 8 is a network topology according to another embodiment of the present disclosure.

The network shown in FIG. 8 includes access, aggregation, and core domains. Each domain is deployed with a separate IGP (such as ISIS) process, but IGP routes are not exposed to each other. The explanation of the AN, AGN, and LSR nodes in FIG. 8 is basically the same as that in the network shown in FIG. 7. In addition, ABR represents an area border router between the aggregation domain and the core domain. In the existing seamless MPLS solution, BGP sessions are generally established between area border routers to advertise BGP-LU detailed routes. For example, ABR1 advertises detailed routes of LSR1 to AGN1 through BGP-LU, and AGN1 in turn advertises the detailed routes of LSR1 to AN1 through the BGP-LU. With the message sending method according to the present disclosure, ABR1 only needs to advertise the route that aggregates all LSRs to AGN1 through BGP-LU, and AGN1 also only needs to advertise a default route (0.0.0.0/0) to AN1 through BGP-LU. For example, a loopback address of LSR1 is 100.1.1.1, a detailed route 100.1.1.1/32 may be learned through an IGP3 process on ABR1, an aggregated route 100.1.0.0/16 may be redistributed to AGN1 through BGP-LU, and AGN1 may continue to redistribute the default route (0.0.0.0/0) to AN1 through BGP-LU. SR-BGP is enabled on the area border routers of the entire network, and SR-ISIS is enabled on the nodes in each IGP domain. The message sending method according to an embodiment of the present disclosure includes operations 801 to 804.

In operation 801, on a node that redistributes an aggregated route, the redistributed aggregated route may be configured as a container FEC and an encapsulation style of the detailed FEC may be configured as Style-2, so that a BGP may assign prefix-sid to the corresponding aggregated route and advertise the prefix-sid to a neighbor (using Container-Label-Index TLV) to generate an ILM table entry.

For example, a container FEC (IPv4 prefix 100.1.0.0/16) and a corresponding ILM table entry (marked as ILM-3) may be generated on ABR1. The label operation in the ILM table entry is POP and the ILM table entry contains a container flag, a Style-2 flag, and an IPv4 flag. ABR1 also maintains a corresponding FTN table entry (marked as FTN-3) for a detailed FEC (IPv4 prefix 100.1.1.1/32). The FTN table entry does not contain a container flag.

A container FEC (IPv4 prefix 0.0.0.0/0) and a corresponding ILM table entry (marked as ILM-2) may be generated on AGN1. The label operation in the ILM table entry is POP and the ILM table entry contains a container flag, a Style-2 flag, and an IPv4 flag. AGN1 also maintains a corresponding FTN table entry (marked as FTN-2) for an FEC (IPv4 prefix 100.1.0.0/16). The FTN table entry contains a container flag and a Style-2 flag.

AN1 may maintain a corresponding FTN table entry (marked as FTN-1) for an FEC (IPv4 prefix 0.0.0.0/0). The FTN table entry contains a container flag and a Style-2 flag.

In operation 802, it is assumed that AN1 needs to send an IPv4 message with a destination IP of LSR1 (100.1.1.1), the message matches the above FTN-1 table entry. Since the FTN-1 table entry contains a container flag and a Style-2 flag, the label given in the FTN-1 table entry is encapsulated in the IPv4 message (and a stack bottom flag of the label is set to 1). Meanwhile, a container header is encapsulated immediately following the label (Type may be set to 1, and host segment information of the detailed FEC information 100.1.1.1 is encapsulated in the container header. Because the prefix length of the default route 0.0.0.0/0 matched by 100.1.1.1 is 0, the entire 100.1.1.1 may be considered as a host segment. It is to be noted that Type may also be set to other values such as 0, 2 and 3, which is a local behavior of AN1). After continuing to encapsulate the label of an outer SR-ISIS LSP, the message is forwarded to AGN1.

In operation 803, after AGN1 receives the message, the label of the message matches the above ILM-2 table entry. The label operation in the ILM-2 table entry is POP and the ILM-2 table entry contains a container flag, a Style-2 flag, and an IPv4 flag. Then, the label at the top layer of the message, container header immediately following the label and the encapsulated detailed FEC information are stripped off, and then a corresponding FTN table entry continues to be looked up based on the detailed FEC information (100.1.1.1, which is obtained by the network segment of FEC 0.0.0.0/0 of ILM-2 and 100.1.1.1) to determine that the message matches the above FTN-2 table entry. Since the FTN-2 table entry contains the container flag and the Style-2 flag, the label given in the FTN-2 table entry is encapsulated in the IPv4 message (and a stack bottom flag of the label is set to 1). Meanwhile, the container header is encapsulated immediately following the label (Type may be set to 1, and host segment information 0.0.1.1 of the detailed FEC information is encapsulated in the container header. Because the prefix length of a route 100.1.0.0/16 matched by 100.1.1.1 is 16, the last 16 bits of the host segment 100.1.1.1 are 0.0.1.1. It is to be noted that Type may also be set to other values such as 0, 2 and 3, which is a local behavior of AGN1). After continuing to be encapsulated with the label of an outer SR-ISIS LSP, the message is forwarded to ABR1.

In operation 804, similarly, after ABR1 receives the message, the label of the message matches the above ILM-3 table entry. Similarly, the label at the top layer of the message, container header immediately following the label and the encapsulated detailed FEC information are stripped off, and then the above FTN-3 table entry continues to be looked up and matched based on the detailed FEC information (100.1.1.1, which is obtained by the network segment of FEC 100.1.0.0/16 of ILM-3 and 0.0.1.1). Since the FTN-3 table entry does not contain the container flag, after the label given in the FTN-3 table entry is encapsulated in the IPv4 message (and a stack bottom flag of the label is set to 1), the container header is no longer encapsulated immediately following the label. After continuing to be encapsulated with the label of an outer SR-ISIS LSP, the message is forwarded to LSR1.

So far, a path that uses label swapping along the entire route from AN1 to LSR1 has been formed. The IPv4 payload has not been exposed throughout the entire process, and the detailed FEC for LSR1 does not need to be advertised in the entire BGP. In addition, it can be seen from the above that the beneficial effect of Style-2 is that detailed FEC information can be encapsulated more flexibly, especially when Type in container header is set to 1, only the host segment information of the detailed FEC complete IP address needs to be encapsulated, which saves the message encapsulation overhead.

Through the description of the above implementations, those having ordinary skill in the art can understand that the method according to the above embodiment may be implemented by means of software plus a necessary general hardware platform, and of course, may also be implemented through hardware, but in many cases, the former is a better implementation. Based on such understanding, the essence of technical solution of the embodiments of the present disclosure, or in other words, the part of the technical solutions making contributions to the conventional art, may be embodied in the form of a software product stored in a storage medium (such as a Read-Only Memory (ROM)/Random Access Memory (RAM), a magnetic disk and an optical disc), including a number of instructions for enabling a terminal device (which may be a mobile phone, a computer, a server, or a network device, etc.) to perform the methods described in various embodiments of the present disclosure.

In an embodiment of the present disclosure, a message sending apparatus and a binding relationship advertising apparatus, which are configured to implement the above embodiments, and those have not been described will not be elaborated. As used below, the term "module" may implement a combination of software and/or hardware of a predetermined function. Although the apparatus described in the following embodiments is preferably implemented in software, the implementation in hardware or a combination of software and hardware is also possible and contemplated.

Figure 9:
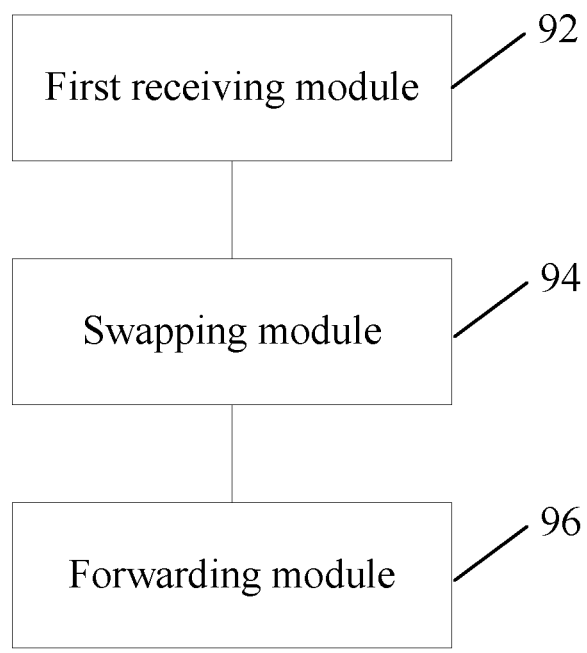
FIG. 9 is a structural block diagram of a message sending apparatus according to an embodiment of the present disclosure.

FIG. 9 is a structural block diagram of a message sending apparatus according to an embodiment of the present disclosure. As shown in FIG. 9, the apparatus includes a first receiving module 92, a swapping module 94 and a forwarding module 96.

The first receiving module 92 is configured to receive a first message on a first node subjected to route aggregation. The swapping module 94 is configured to swap, in a case where the first message matches a first ILM table entry preset on the first node, a label of the first message into an outgoing label corresponding to a detailed FEC to obtain a second message. The forwarding module 96 is configured to forward the second message to a downstream node according to an LSP corresponding to the detailed FEC.

According to the embodiment of the present disclosure, the apparatus may further include at least one of the following: a configuration module, configured to configure, before the first receiving module 92 receives the first message on the first node subjected to the route aggregation, an aggregated route as a first container FEC on the first node, wherein the first container FEC carries a container flag used for identifying that the first container FEC is of a container FEC type; and a creation module, configured to create, before the first receiving module 92 receives the first message on the first node subjected to the route aggregation, the first ILM table entry for the first container FEC, wherein the first ILM table entry carries the container flag.

According to the embodiment of the present disclosure, the swapping module 94 is configured to: in a case where the first message matches the first ILM table entry, look up the outgoing label corresponding to the detailed FEC according to encapsulation information following a container label in a message label stack, and swap the container label in the message label stack into the found outgoing label corresponding to the detailed FEC. The message label stack is a label stack pre-generated on a node upstream of the first node, the container label is an MPLS label having a binding relationship with the first container FEC, and the encapsulation information is information about the detailed FEC encapsulated following the container label in the message label stack.

According to the embodiment of the present disclosure, the apparatus is further configured to configure, before looking up the outgoing label corresponding to the detailed FEC according to the encapsulation information following the container label in the message label stack, the binding relationship.

According to the embodiment of the present disclosure, the apparatus is further configured to advertise, after configuring the binding relationship, the binding relationship to nodes other than the first node.

According to the embodiment of the present disclosure, the swapping module 94 may look up the outgoing label corresponding to the detailed FEC in the following manners: looking up a first FTN table entry corresponding to the detailed FEC according to the encapsulation information following the container label in the message label stack; and in a case where the first FTN table entry is found, determining an outgoing label in the first FTN table entry as the outgoing label corresponding to the detailed FEC.

According to the embodiment of the present disclosure, the apparatus is further configured to execute, after looking up the first FTN table entry corresponding to the detailed FEC according to the encapsulation information following the container label in the message label stack, at least one of the following operations: in a case where the first FTN table entry is not found and a stack bottom flag of the container label in the message label stack is determined to be valid, removing the container label in the message label stack and the encapsulation information following the container label, looking up in a routing table according to an IP payload, and forwarding the first message according to the routing table; and in a case where the first FTN table entry is not found and a stack bottom flag of the container label in the message label stack is determined to be invalid, discarding the first message.

According to the embodiment of the present disclosure, the apparatus is further configured to maintain, before looking up the first FTN table entry corresponding to the detailed FEC according to the encapsulation information following the container label in the message label stack, the first FTN table entry corresponding to the first FEC generated by a previous node of the first node, wherein the previous node of the first node includes a node originally generating the first FEC.

According to the embodiment of the present disclosure, when a type of the first FEC generated by the previous node of the first node is not a container FEC, the first FTN table entry does not include the container flag; and when the type of the first FEC generated by the previous node of the first node is a container FEC, the first FTN table entry includes the container flag.

According to the embodiment of the present disclosure, when the first FTN table entry does not include the container flag, the container label in the message label stack is swapped into an outgoing label in the first FTN table entry, and the encapsulation information following the container label in the first message is removed; and when the first FTN table entry includes the container flag, the container label in the message label stack is swapped into an outgoing label in the first FTN table entry, and the encapsulation information following the container label in the message label stack is reserved.

According to the embodiment of the present disclosure, an encapsulation form of the encapsulation information includes at least one of the following: an encapsulation form of directly encapsulating IP address information of the detailed FEC; and an encapsulation form of encapsulating at least one of the following information using an encapsulation header: IP address information, MPLS label information, and Segment Identification (SID) information of the detailed FEC, wherein the IP address information includes one of the following: complete IP address information, and host segment information including only an IP address.

According to the embodiment of the present disclosure, the apparatus is further configured to advertise the encapsulation form of the detailed FEC to nodes other than the first node.

According to the embodiment of the present disclosure, an advertising mode of the apparatus includes at least one of the following: extending an MPLS label protocol of a label binding message for advertising a prefix type FEC, and advertising by using the extended MPLS label protocol; and extending an SR protocol of a label binding message for advertising a prefix type FEC, and advertising by using the extended SR protocol.

According to the embodiment of the present disclosure, when the MPLS label protocol includes an LDP, the apparatus extends the LDP of the label binding message for advertising the prefix type FEC in the following manners: adding, based on RFC5036, a Container Label TLV to the LDP; and advertising by using the Container Label TLV in the extended LDP.

According to the embodiment of the present disclosure, when the SR protocol includes an ISIS protocol, the apparatus extends the ISIS protocol of the label binding message for advertising the prefix type FEC in the following manners: adding, based on draft-ietf-isis-segment-routing-extensions-16, a Container-Prefix-SID Sub-TLV to the ISIS protocol; and advertising by using the Container-Prefix-SID Sub-TLV in the extended ISIS protocol.

According to the embodiment of the present disclosure, when the SR protocol includes a BGP, the apparatus is configured to extend the BGP of the label binding message for advertising the prefix type FEC in the following manner: adding, based on draft-ietf-idr-bgp-perfix-sid-20, a Container-Label-Index TLV to the BGP, the Container-Label-Index TLV being carried along with BGP Prefix-SID attributes; and advertising by using the Container-Label-Index TLV in the extended BGP.

According to the embodiment of the present disclosure, a label operation in the first ILM table entry is POP.

Figure 10:
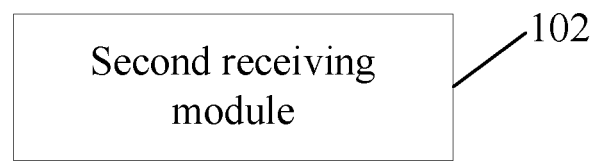
FIG. 10 is a structural block diagram of a binding relationship advertising apparatus according to an embodiment of the present disclosure.

FIG. 10 is a structural block diagram of a binding relationship advertising apparatus according to an embodiment of the present disclosure. As shown in FIG. 10, the apparatus includes a second receiving module 102.

The second receiving module 102 is configured to receive, on a second node, a binding relationship advertised by a first node. Herein, the first node is a node subjected to route aggregation. The binding relationship is a binding relationship between a container label and a first container FEC. The container label is a label pre-assigned in the first node to the first container FEC. The first container FEC is an FEC which carries a container flag and is obtained after an aggregated route on the first node is configured. The container flag is used for identifying that the first container FEC is of a container FEC type.

According to the embodiment of the present disclosure, the apparatus may further include: an assigning module, configured to execute, after receiving, on the second node, the binding relationship advertised by the first node, at least one of the following operations: when the second node is a transmission node of the first container FEC, assigning a new container label to the first container FEC, then continuing to advertise a binding relationship between the new container label and the first container FEC to an upstream node, and creating a second ILM table entry corresponding to the first container FEC, wherein the second ILM table entry carries the container flag; and when the second node is an ingress node of the first container FEC, creating a corresponding second FTN table entry for the first container FEC, wherein the second FTN table entry carries the container flag.

According to the embodiment of the present disclosure, the apparatus may further include: a first processing module, configured to execute, after creating the second ILM table entry corresponding to the first container FEC, at least one of the following operations: in a case where the received message matches the second ILM table entry, executing a label swapping operation according to a container label located at a top layer of the message, and ignoring information about a detailed FEC following the container label of the message; or, in a case where the received message matches the second ILM table entry and a TTL of the container label located at a top layer of the message times out, uploading the message to a control plane for processing, wherein information about a detailed FEC following the container label in the message is not a label.

According to the embodiment of the present disclosure, the apparatus may further include: a second processing module, configured to encapsulate, after creating the corresponding second FTN table entry for the first container FEC, a container label in the second FTN table entry for the message in a case where the received message matches the second FTN table entry, and encapsulate information about a detailed FEC following the container label, wherein the container label and the information about the detailed FEC are integrated.

According to the embodiment of the present disclosure, a label operation in the second ILM table entry is SWAP.

According to the embodiment of the present disclosure, the apparatus is further configured to receive, on the second node, an encapsulation form advertised by the first node, wherein the encapsulation form is an encapsulation form of information about a detailed FEC encapsulated following a container label in a message label stack in the first node.

According to the embodiment of the present disclosure, the encapsulation form includes at least one of the following: an encapsulation form of directly encapsulating IP address information of the detailed FEC; and an encapsulation form of encapsulating at least one of the following information using an encapsulation header: IP address information, MPLS label information and SID information of the detailed FEC, wherein the IP address information includes one of the following: complete IP address information, and host segment information including only an IP address.

It is to be noted that each of the above modules may be implemented by software or hardware. For the latter, the modules may be implemented by, but not limited to, either of the following manners: the above modules are all located in the same processor; or, the above modules are located in different processors in any combination form respectively.

The embodiment of the present disclosure provides a storage medium. The storage medium stores a computer program that, when executed by a processor, performs the message sending method according to the embodiment of the present disclosure.

In the embodiment of the present disclosure, the storage medium may include, but is not limited to, various media capable of storing a computer program such as a U disk, a Read-Only Memory (ROM), a Random Access Memory (RAM), a mobile hard disk, a magnetic disk or an optical disc.

The embodiment of the present disclosure provides an electronic device. The electronic device includes a memory and a processor. The memory stores a computer program. The processor is configured to run the computer program to perform the message sending method according to the embodiment of the present disclosure.

The electronic device may further include a transmission device and an input-output device. The transmission device is connected to the processor, and the input-output device is connected to the processor.

By adopting the method of the present disclosure, there is no need to configure a complicated strategy for controlling the advertising of the detailed FEC to establish an end-to-end MPLS LSP, and it is only necessary to simply establish an end-to-end MPLS LSP with route aggregation.

It is apparent that a person skilled in the art shall understand that all of the above-mentioned modules or operations in the present disclosure may be implemented by using a general computation apparatus, may be centralized on a single computation apparatus or may be distributed on a network composed of multiple computation apparatuses. Optionally, they may be implemented by using executable program codes of the computation apparatuses. Thus, they may be stored in a storage apparatus and executed by the computation apparatuses, the shown or described operations may be executed in a sequence different from this sequence under certain conditions, or they are manufactured into each integrated circuit module respectively, or multiple modules or operations therein are manufactured into a single integrated circuit module. Thus, the embodiments of the present disclosure are not limited to any specific hardware and software combination.

The above is only the exemplary embodiments of the present disclosure, not intended to limit the present disclosure. As will occur to those having ordinary skill in the art, the present disclosure is susceptible to various modifications and changes. Any modifications, equivalent replacements, improvements and the like made within the principle of the present disclosure shall fall within the scope of protection of the present disclosure.

What is claimed is:

1. A message sending method performed by a first node subjected to route aggregation, comprising:

configuring, on a first node, an aggregated route as a first container Forwarding Equivalence Class (FEC), wherein the first container FEC carries a container flag used for identifying that the first container FEC is of a container FEC type;

creating a first Incoming Label Map (ILM) table entry for the first container FEC, wherein the first ILM table entry carries the container flag;

receiving a first message on the first node;

in a case where the first message matches the first ILM table entry preset on the first node, swapping a label of the first message into an outgoing label corresponding to a detailed FEC to obtain a second message, wherein swapping the label of the first message into the outgoing label corresponding to the detailed FEC comprises:
looking up the outgoing label corresponding to the detailed FEC according to encapsulation information following a container label in a message label stack, wherein the message label stack is a label stack generated on a node upstream of the first node, the container label is a Multiprotocol Label Switching (MPLS) label having a binding relationship with the first container FEC, and the encapsulation information is information about the detailed FEC encapsulated following the container label in the message label stack; and
swapping the container label in the message label stack into the found outgoing label corresponding to the detailed FEC; and forwarding the second message to a downstream node according to a Label Switched Path (LSP) corresponding to the detailed FEC.

2. The method according to claim 1, wherein before looking up the outgoing label corresponding to the detailed FEC according to the encapsulation information following the container label in the message label stack, the method further comprises:

configuring the binding relationship.

3. The method according to claim 2, wherein after configuring the binding relationship, the method further comprises:
advertising the binding relationship to nodes other than the first node.

4. The method according to claim 1, wherein looking up the outgoing label corresponding to the detailed FEC according to the encapsulation information following the container label in the message label stack comprises:
looking up a first FEC to Next Hop Label Forwarding Element (NHLFE) Map (FTN) table entry corresponding to the detailed FEC according to the encapsulation information following the container label in the message label stack; and
in a case where the first FTN table entry is found, determining an outgoing label in the first FTN table entry as the outgoing label corresponding to the detailed FEC.

5. The method according to claim 4, wherein after looking up the first FTN table entry corresponding to the detailed FEC according to the encapsulation information following the container label in the message label stack, the method further comprises at least one of the following:
in a case where the first FTN table entry is not found and a stack bottom flag of the container label in the message label stack is determined to be valid, removing the container label in the message label stack and the encapsulation information following the container label, looking up in a routing table according to an Internet Protocol (IP) payload, and forwarding the first message according to the routing table; and
in a case where the first FTN table entry is not found and a stack bottom flag of the container label in the message label stack is determined to be invalid, discarding the first message;
or,
before looking up the first FTN table entry corresponding to the detailed FEC according to the encapsulation information following the container label in the message label stack, the method further comprises:
maintaining the first FTN table entry corresponding to the first FEC generated by a previous node of the first node, wherein the previous node of the first node comprises a node originally generating the first FEC.

6. The method according to claim 5, further comprising at least one of the following:
when a type of the first FEC generated by the previous node of the first node is not a container FEC, the first FTN table entry does not comprise the container flag; and
when the type of the first FEC generated by the previous node of the first node is a container FEC, the first FTN table entry comprises the container flag.

7. The method according to claim 6, further comprising at least one of the following:
when the first FTN table entry does not comprise the container flag, swapping the container label in the message label stack into an outgoing label in the first FTN table entry, and removing the encapsulation information following the container label in the first message; and
when the first FTN table entry comprises the container flag, swapping the container label in the message label stack into an outgoing label in the first FTN table entry, and reserving the encapsulation information following the container label in the message label stack.

8. The method according to claim 4, wherein an encapsulation form of the encapsulation information comprises at least one of the following:
an encapsulation form of directly encapsulating IP address information of the detailed FEC; and
an encapsulation form of encapsulating at least one of the following information using an encapsulation header: IP address information, MPLS label information, and Segment Identification (SID) information of the detailed FEC,
wherein the IP address information comprises one of the following: complete IP address information, or host segment information comprising only an IP address.

9. The method according to claim 8, further comprising:
advertising the encapsulation form of the encapsulation information to nodes other than the first node.

10. The method according to claim 3, wherein an advertising mode of advertising comprises at least one of the following:
extending an MPLS label protocol of a label binding message for advertising a prefix type FEC, and advertising by using the extended MPLS label protocol; and
extending a Segment Routing (SR) protocol of a label binding message for advertising a prefix type FEC, and advertising by using the extended SR protocol.

11. The method according to claim 1, wherein a label operation in the first ILM table entry is POP.

12. A controller comprising a memory storing instructions and a processor in communication with the memory, wherein the processor is configured to execute the instruction to implement the method of claim 1.

13. A binding relationship advertising method performed by a second node, comprising:
receiving, on a second node, a binding relationship advertised by a first node, wherein the first node is a node subjected to route aggregation, the binding relationship is a binding relationship between a container label and a first container Forwarding Equivalence Class (FEC), the container label is a label pre-assigned in the first node to the first container FEC, the first container FEC is an FEC which carries a container flag and is obtained after an aggregated route on the first node is configured, and the container flag is used for identifying that the first container FEC is of a container FEC type,
wherein after receiving, on the second node, the binding relationship advertised by the first node, the method further comprises at least one of the following:
when the second node is a transmission node of the first container FEC, assigning a new container label to the first container FEC, then continuing to advertise a binding relationship between the new container label and the first container FEC to an upstream node, and creating a second Incoming Label Map (ILM) table entry corresponding to the first container FEC, wherein the second ILM table entry carries the container flag; and
when the second node is an ingress node of the first container FEC, creating a corresponding second FEC to Next Hop Label Forwarding Element (NHLFE) Map (FTN) table entry for the first container FEC, wherein the second FTN table entry carries the container flag.

14. The method according to claim 13, wherein after creating the second ILM table entry corresponding to the first container FEC, the method further comprises:
in a case where the received message matches the second ILM table entry, executing a label swapping operation according to a container label located at a top layer of the message, and ignoring information about a detailed FEC following the container label of the message; or, in a case where the received message matches the second ILM table entry and a Time-to-Live value (TTL) of the container label located at a top layer of the message times out, uploading the message to a control plane for processing, wherein information about a detailed FEC following the container label in the message is not a label; or, in a case where the received message matches the second FTN table entry, encapsulating a container label in the second FTN table entry for the message, and encapsulating information about a detailed FEC following the container label, wherein the container label and the information about the detailed FEC are integrated.

15. The method according to claim 13, wherein a label operation in the second ILM table entry is SWAP.

16. The method according to claim 13, further comprising:

receiving, on the second node, an encapsulation form advertised by the first node, wherein the encapsulation form is an encapsulation form of information about a detailed FEC encapsulated following a container label in a message label stack in the first node.

17. The method according to claim 16, wherein the encapsulation form comprises at least one of the following:

an encapsulation form of directly encapsulating IP address information of the detailed FEC; and an encapsulation form of encapsulating at least one of the following information using an encapsulation header: IP address information, Multiprotocol Label Switching (MPLS) label information, and Segment Identification (SID) information of the detailed FEC, wherein the IP address information comprises one of the following: complete IP address information, or host segment information comprising only an IP address.

18. A controller comprising a memory storing instructions and a processor in communication with the memory, wherein the processor is configured to execute the instruction to implement the method of claim 13.

* * * * *